United States Patent
Das et al.

(10) Patent No.: US 9,742,876 B2
(45) Date of Patent: *Aug. 22, 2017

(54) SPAN OUT LOAD BALANCING MODEL

(71) Applicant: Microsoft Technology Licensing, LLC, Redmond, WA (US)

(72) Inventors: Archan Das, Hyderabad (IN); Gopikrishna Kannan, Hyderabad (IN); Ravi K. Balachandran, Hyderabad (IN); Vikash Bucha, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/018,798

(22) Filed: Feb. 8, 2016

(65) Prior Publication Data

US 2016/0156745 A1 Jun. 2, 2016

Related U.S. Application Data

(63) Continuation of application No. 13/166,021, filed on Jun. 22, 2011, now Pat. No. 9,292,248.

(51) Int. Cl.
*H04L 29/06* (2006.01)
*H04L 29/08* (2006.01)
(Continued)

(52) U.S. Cl.
CPC ............ *H04L 67/42* (2013.01); *G06F 3/1454* (2013.01); *G06F 9/4445* (2013.01); *H04L 67/08* (2013.01); *H04L 67/141* (2013.01); *H04L 69/164* (2013.01); *H04L 9/3247* (2013.01); *H04L 61/6063* (2013.01)

(58) Field of Classification Search
CPC ... G06F 3/1454; G06F 9/4445; H04L 9/3247; H04L 67/08; H04L 67/42; H04L 67/141; H04L 69/164; H04L 61/6063
See application file for complete search history.

(56) References Cited

U.S. PATENT DOCUMENTS 6,018,770 A 1/2000 Little et al.
6,363,081 B1 3/2002 Gase
(Continued)

OTHER PUBLICATIONS

Kopparapu, "Load Balancing Servers, Firewalls, and Caches, Wiley & Sons," 2002, pp. 1-223.
(Continued)

*Primary Examiner* — Jung Kim
*Assistant Examiner* — James J Wilcox
(74) *Attorney, Agent, or Firm* — Baker & Hostetler LLP

(57) ABSTRACT

This document describes techniques for transporting at least a portion of the data for a remote presentation session via datagrams. In particular, a span-out model is described whereby a remote presentation session can be associated with multiple channels and each channel can be routed through a different gateway computer system. As such, a connectionless oriented channel for a client may be routed through a first gateway computer system and a connection oriented channel for the client may be routed through a second gateway computer system. In addition to the foregoing, other techniques are described in the claims, the attached drawings, and the description.

20 Claims, 14 Drawing Sheets

(51) Int. Cl.
*G06F 3/14* (2006.01)
*G06F 9/44* (2006.01)
*H04L 9/32* (2006.01)
*H04L 29/12* (2006.01)

(56) References Cited

U.S. PATENT DOCUMENTS

| | | | |
|---|---|---|---|
| 6,415,329 B1 | 7/2002 | Gelman et al. | |
| 6,427,170 B1* | 7/2002 | Sitaraman | H04L 29/12066 709/226 |
| 6,516,000 B1* | 2/2003 | Kshirsagar | H04L 12/4608 370/399 |
| 6,606,708 B1 | 8/2003 | Devine et al. | |
| 6,628,617 B1* | 9/2003 | Karol | H04L 12/66 370/230.1 |
| 6,721,333 B1 | 4/2004 | Milton et al. | |
| 7,016,328 B2 | 3/2006 | Chari et al. | |
| 7,269,169 B1 | 9/2007 | Venkataraman et al. | |
| 7,330,425 B1* | 2/2008 | Gulati | H04L 12/5695 370/217 |
| 7,392,323 B2 | 6/2008 | Yim et al. | |
| 7,453,875 B2 | 11/2008 | Vernal et al. | |
| 7,586,879 B2* | 9/2009 | Chari | H04L 29/12018 370/331 |
| 7,870,277 B2 | 1/2011 | Korrapati et al. | |
| 8,045,559 B2 | 10/2011 | Yamada et al. | |
| 8,688,845 B2* | 4/2014 | Sampath | H04L 63/20 709/227 |
| 9,292,248 B2* | 3/2016 | Das | H04L 69/164 |
| 9,430,036 B1* | 8/2016 | Kominac | G06F 3/01 |
| 9,535,560 B1* | 1/2017 | Kominac | G06F 3/048 |
| 2002/0161895 A1* | 10/2002 | Appiah | H04L 67/22 709/227 |
| 2003/0074445 A1 | 4/2003 | Roach et al. | |
| 2005/0010754 A1 | 1/2005 | Brendel | |
| 2005/0030959 A1 | 2/2005 | Kunze et al. | |
| 2006/0029063 A1* | 2/2006 | Rao | H04L 12/2856 370/389 |
| 2006/0130133 A1 | 6/2006 | Andreev et al. | |
| 2006/0174006 A1 | 8/2006 | Hallenstal et al. | |
| 2006/0277596 A1 | 12/2006 | Calvert et al. | |
| 2007/0011733 A1* | 1/2007 | Gbadegesin | H04L 29/12066 726/11 |
| 2007/0180081 A1 | 8/2007 | Okmianski et al. | |
| 2008/0101357 A1 | 5/2008 | Iovanna et al. | |
| 2008/0201486 A1* | 8/2008 | Hsu | H04L 29/06 709/238 |
| 2008/0270612 A1 | 10/2008 | Malakapalli et al. | |
| 2009/0235342 A1* | 9/2009 | Manion | H04L 67/08 726/7 |
| 2009/0292817 A1* | 11/2009 | Cho | H04L 41/28 709/230 |
| 2010/0070609 A1* | 3/2010 | Ramiah | G06F 15/177 709/218 |
| 2010/0131654 A1* | 5/2010 | Malakapalli | H04L 67/08 709/227 |
| 2010/0333149 A1 | 12/2010 | Sharma et al. | |
| 2011/0296186 A1* | 12/2011 | Wong | H04L 63/0272 713/171 |
| 2012/0084381 A1* | 4/2012 | Alladi | G06F 9/544 709/213 |
| 2012/0151372 A1* | 6/2012 | Kominac | G06F 17/30905 715/740 |
| 2012/0173748 A1* | 7/2012 | Bouazizi | H04L 65/4084 709/231 |
| 2012/0226742 A1 | 9/2012 | Momchilov et al. | |
| 2012/0331032 A1* | 12/2012 | Balachandran | H04L 69/164 709/202 |
| 2013/0174242 A1* | 7/2013 | Snow | H04N 21/41407 726/7 |
| 2014/0115047 A1* | 4/2014 | Zhou | H04L 69/30 709/203 |
| 2014/0304393 A1* | 10/2014 | Annamalaisami | H04L 43/04 709/224 |
| 2015/0207834 A1* | 7/2015 | Zhao | H04N 21/631 709/231 |

OTHER PUBLICATIONS

"Cookies and Authentication", msdn, http://msdn.microsoft.com/en-us/library/ee799134(v=cs.10).aspx, accessed Mar. 3, 2011, 4 pages.

"Understanding Load Balancing in Exchange 2010", http://technet.microsoft.com/en-us/library/ff625247.aspx, accessed Mar. 3, 2011, 9 pages.

Berry, "Sharing Cookies Across Domains", http://www.15seconds.com/issue/971108.htm, accessed Mar. 1, 2011, 4 pages.

Roth, "Server Load Balancing Architectures, Part 2: Application-Level Load Balancing", http://www.javaworld.com/javaworld/jw-10-2008/jw-10-load-balancing-2.html- , accessed Mar. 3, 2011, 1 page.

"Multiple UDP ports", Stack Overilow, http://stackoverilow.com/questions/3013827/multiple-udp-ports, accessed Feb. 28, 2011, 2 pages.

"Service Overview and Network Port Requirements for the Windows Server System", Microsoft Support, http://support.microsoft.com/kb/832017, accessed Feb. 28, 2011, 20 pages.

Horman, "iproxy: Running TCP services over UDP", Jan. 2002, 16 pages.

* cited by examiner

702 Broker

718 Mapping Table

| Connection Identifier | Client Address | Socket Handle |
|---|---|---|
| 1 | Network Address for Client 752 | Socket Handle for Connection Object 710 |
| 2 | Network Address for Client 754 | Socket Handle for Connection Object 712 |
| 3 | Network Address for Client 756 | Socket Handle for Connection Object 714 |
| 4 | Network Address for Client 758 | Socket Handle for Connection Object 716 |

760 Resource Broker

762 Mapping Table

| Connection Identifier | Gateway Address | Session Identifier |
|---|---|---|
| 1 | Network Address for C.O. 710 | A |
| 2 | Network Address for C.O. 712 | B |

764 Resource Broker

766 Mapping Table

| Connection Identifier | Gateway Address | Session Identifier |
|---|---|---|
| 3 | Network Address for C.O. 714 | A |

768 Resource Broker

770 Mapping Table

| Connection Identifier | Gateway Address | Session Identifier |
|---|---|---|
| 4 | Network Address for C.O. 716 | A |

FIG. 8

SPAN OUT LOAD BALANCING MODEL

CROSS REFERENCE TO RELATED APPLICATIONS

This application is a continuation of U.S. patent application Ser. No. 13/166,021, now U.S. Pat. No. 9,292,248 B2, filed Jun. 22, 2011, which is related to U.S. patent application Ser. No. 13/166,003, filed Jun. 22, 2011. The contents of which are herein incorporated by reference in its entirety.

BACKGROUND

Resources on a server can be shared with a client computing device using remote presentation technologies. One exemplary remote presentation session is called a remote desktop session. In such a session a desktop is spawned on a server and a communication channel is established between the server and a client. In this type of a session the client interacts with the desktop by sending keyboard strokes and mouse clicks to the server. Images indicative of the graphical user interface of the desktop are received from the server and displayed by the client.

Another type of remote presentation session is called a remote application session. A remote application session is similar to a remote desktop session in that user input is sent to the server; however, a graphical user interface for an application is sent to the client instead of an entire desktop. As might be expected, the user is limited to interacting a single application rather than a desktop in this type of session.

In addition to the foregoing, another exemplary remote presentation session is called a virtual desktop session. A virtual desktop session is similar to a remote desktop session with a few notable differences. For example, a user does not share an operating system with other users in a virtual desktop session; rather, the user has a console session running within a virtual machine. As such, a virtual desktop session can be thought of as a personal computer environment that has its graphical user interface sent to the client.

SUMMARY

At a high-level of abstraction, this document describes a remote presentation infrastructure. In an exemplary embodiment, at least a portion of the data associated with a remote presentation session can be sent via a connectionless channel established between a client and server and other data can be transported via a connection based channel. Accordingly, in an exemplary embodiment, multiple channels can be used to transport data for a remote presentation session.

In an exemplary configuration, a Remote Desktop Gateway computer system can straddle a firewall that prevents remote presentation servers from being directly accessed by clients coupled to a public network, such as the Internet. The Remote Desktop Gateway computer system can include multiple network interface cards: one having a public IP address and the other having a private IP address. Clients can communicate with the public network interface card and the Remote Desktop Gateway computer system can communicate with the remote presentation servers via the private network interface card on behalf of the clients. In an embodiment, the Remote Desktop Gateway computer system can include a broker, which can be configured to receive datagrams and route them to the correct destination. For example, the broker can receive datagrams from clients and route the data stored therein to the correct remote presentation server. Similarly, the broker can receive datagrams from remote presentation servers and route the data contained therein to the correct clients.

In an exemplary embodiment, a span-out model is described whereby a remote presentation session can be associated with multiple channels and each channel can be routed through a different Remote Desktop Gateway computer system. As such, a connectionless oriented channel for a client may be routed through a first Remote Desktop Gateway computer system and a connection oriented channel for the client may be routed through a second Remote Desktop Gateway computer system. In addition to the foregoing, other techniques are described in the claims, the attached drawings, and the description.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 8 depicts a specific example of the data that could be found in mapping tables.

DETAILED DESCRIPTION

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., an execution unit that reads and executes instructions, configured by firmware and/or software. Processor(s) and the like can be configured by instructions loaded from memory, e.g., RAM, ROM, firmware, and/or mass storage, and the instructions can embody logic operable to configure the processor to perform one or more function. A specific example of circuitry can include a combination of hardware and software. In this specific example, an implementer may write source code embodying logic that is subsequently compiled into machine readable code that can be executed by the processor.

One skilled in the art can appreciate that the state of the art has evolved to a point where there is little difference between functions implemented in hardware and functions implemented in software (which are subsequently executed by hardware). As such, the description of functions as being implemented in hardware or software is merely a design choice. Simply put, since a software process can be transformed into an equivalent hardware structure and a hardware structure can itself be transformed into an equivalent software process, functions described as embodied in instructions could alternatively be implemented in hardware and vice versa.

Figure 9:
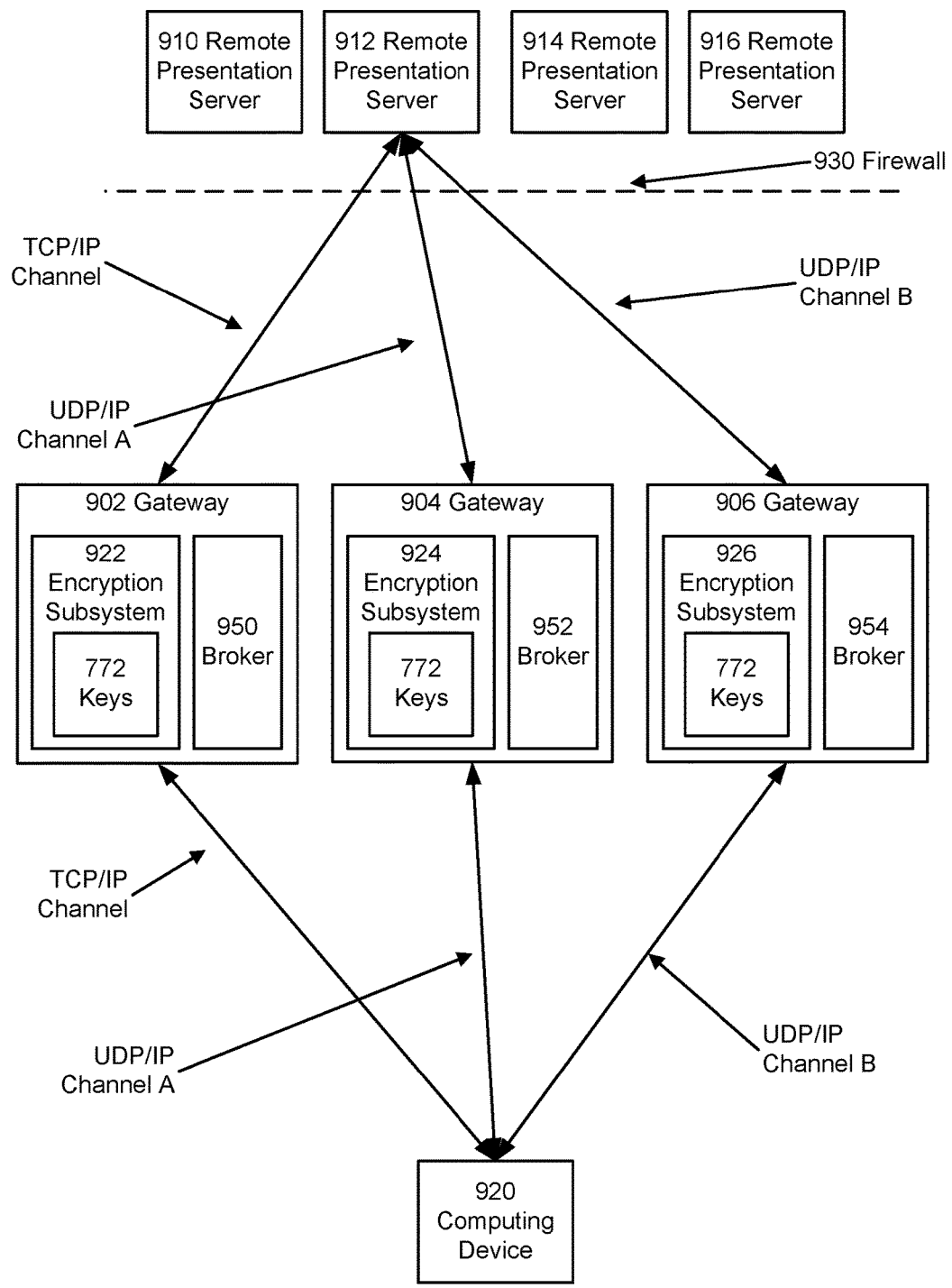
FIG. 9 depicts a block diagram of an operational environment for a span-out model for handling effectuating remote presentation sessions.

Referring now to FIG. 1 through FIG. 6, these figures illustrate suitable exemplary operational environments that can be used to embody techniques for sending remote presentation session data via connectionless channels, e.g., via uniform datagram protocol ("UDP") based datagrams. For ease of understanding, the figures are organized such that FIG. 1 through FIG. 6 describe exemplary execution environments, FIG. 7-9 provide further detail, and FIG. 10-14 describe operational procedures.

Figure 1:
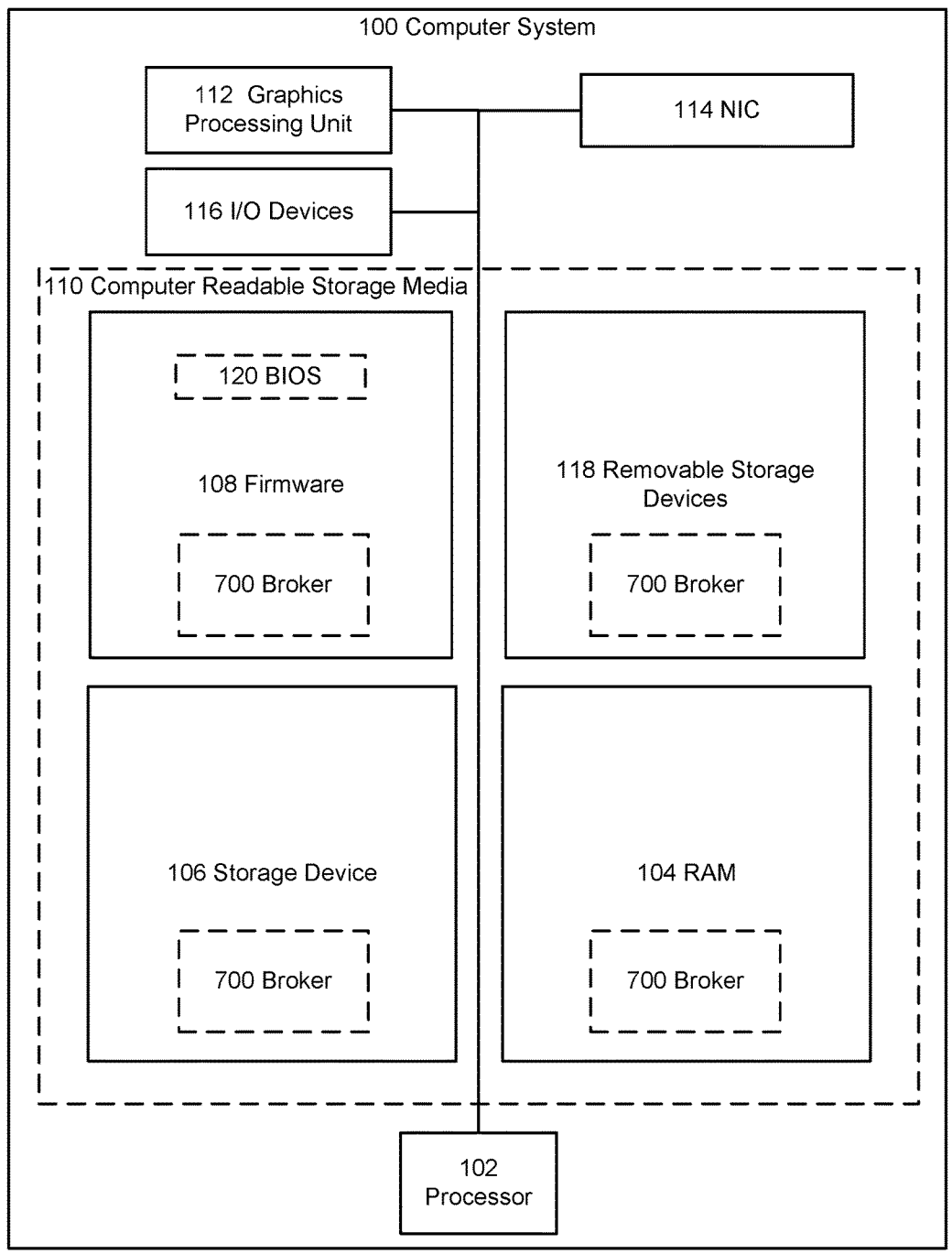
FIG. 1 depicts a high-level block diagram of a computer system.

Turning now to FIG. 1, it shows an exemplary computer system 100. Computer system 100 can include processor 102, e.g., an execution core (while one processor 102 is illustrated, in other embodiments computer system 100 may have multiple processors, e.g., multiple execution cores per processor substrate and/or multiple processor substrates that could each have multiple execution cores). In addition to processor 102, computer system 100 can include various computer-readable storage media 110, which can be interconnected by one or more system buses that couple various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory ("RAM") 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer-readable storage media 110 can provide non volatile and/or volatile storage of processor executable instructions 122, data structures, program modules and other data for the computer 100. A basic input/output system ('BIOS') 120, containing the basic routines that help to transfer information between elements within the computer system 100, such as during start up, can be stored in firmware 108. A number of programs may be stored on firmware 108, storage device 106, RAM 104, and/or removable storage devices 118. These programs can include an operating system and/or application programs. In a specific embodiment, computer-readable storage media 110 of a Remote Desktop Gateway server can store Broker 702, which is described in more detail in the following paragraphs. In this example embodiment, Broker 702 can be executed by processor 102 thereby transforming computer system 100 into a computer system configured for a specific purpose, i.e., a computer system configured according to techniques described in this document.

Commands and information may be received by computer 100 through input devices 116, e.g., a keyboard and a mouse. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus ("USB"). A display or other type of display device can also be connected to the system bus via an interface, such as a DVI interface which can be connected to a graphics processor unit 112. In addition to the display, computers typically include other peripheral output devices, such as speakers and printers (not shown). The exemplary system of FIG. 1 can also include a host adapter, a Small Computer System Interface ("SCSI") bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
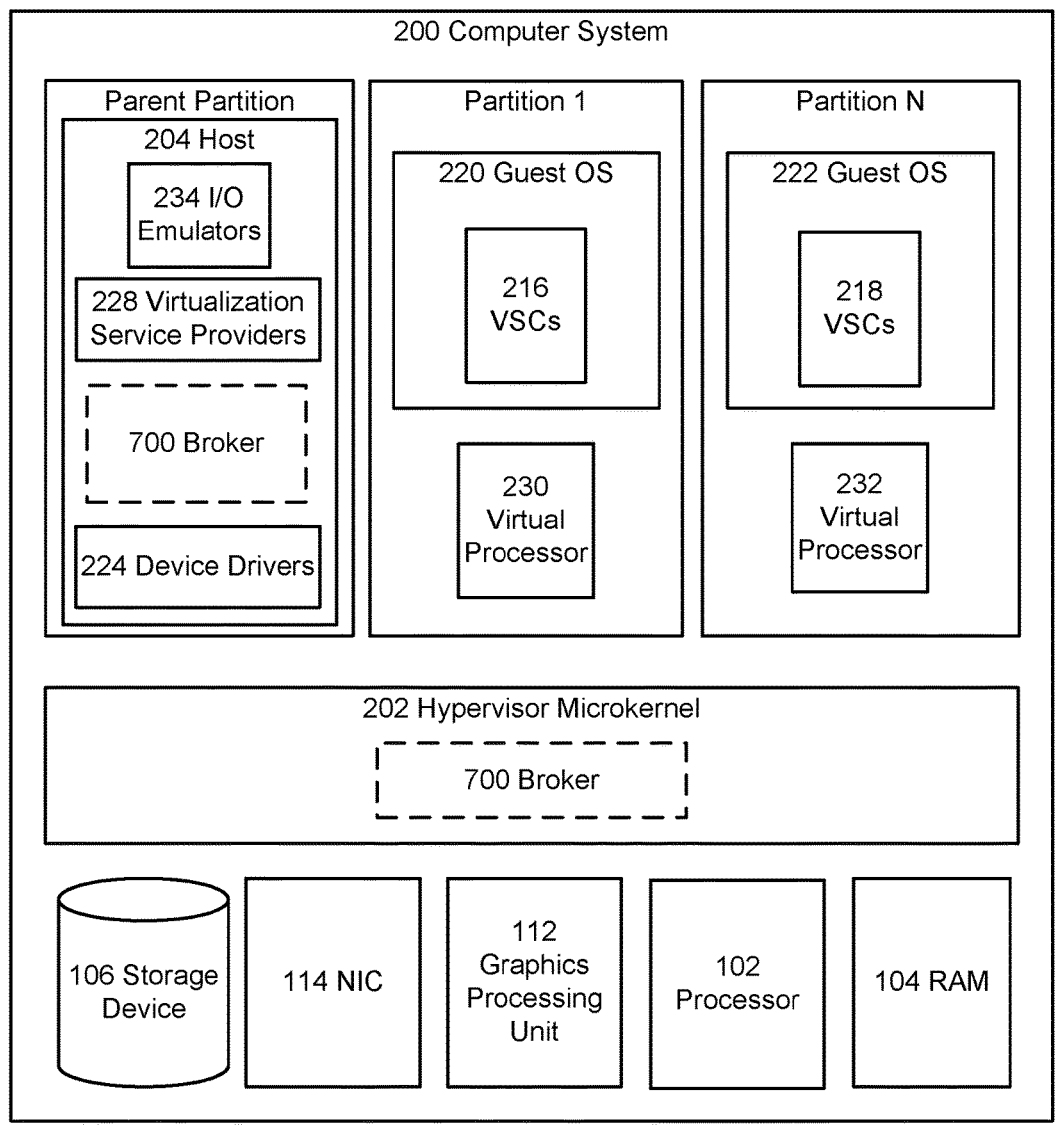
FIG. 2 depicts a high-level block diagram of an exemplary architecture for a virtualizing software program.
Figure 3:
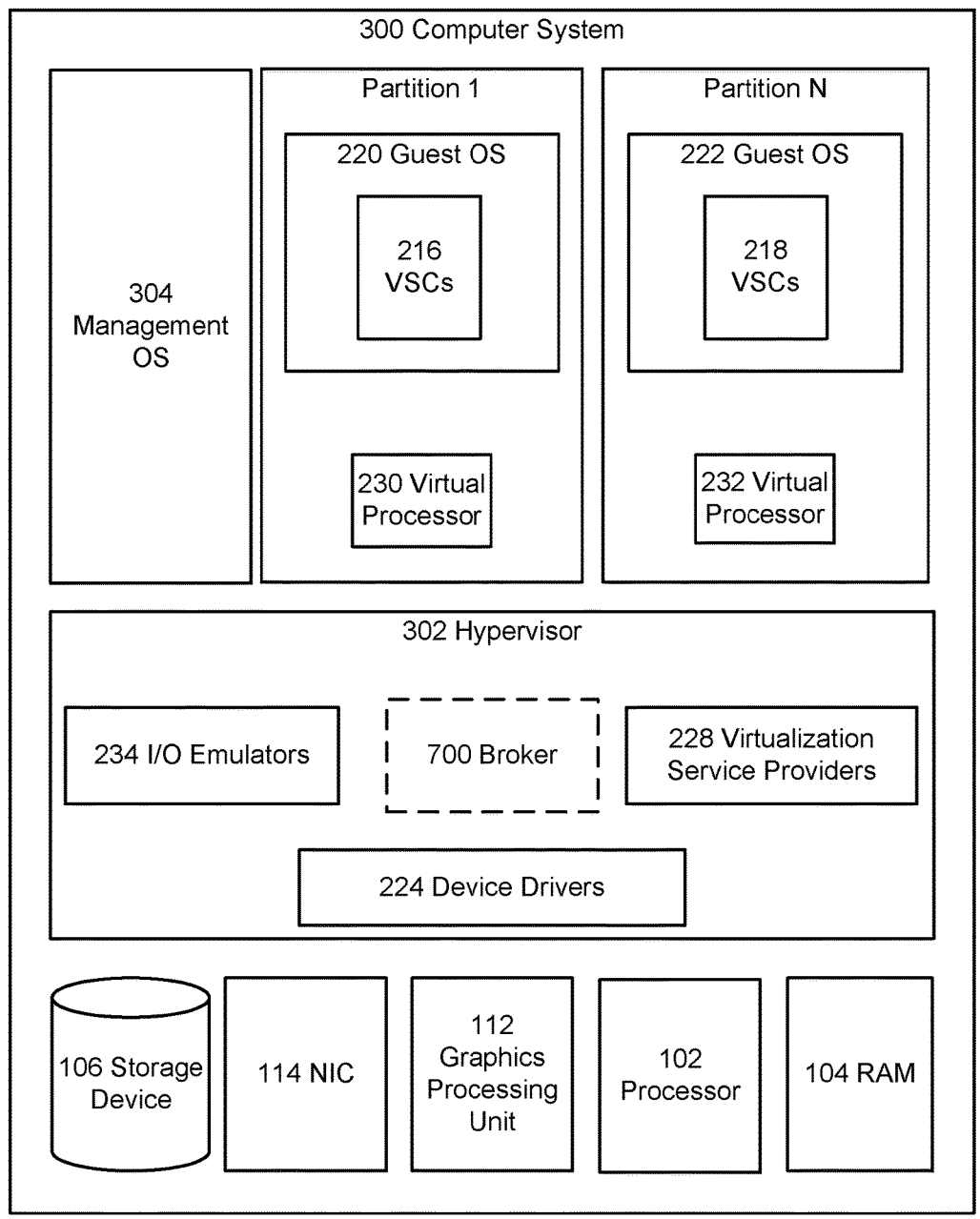
FIG. 3 depicts a high-level block diagram of an alternative architecture for a virtualizing software program.

Turning to FIG. 2 and FIG. 3, illustrated are exemplary virtualization platforms that can be used to generate the virtual machines used to host virtual desktop sessions. In this embodiment, hypervisor microkernel 202 can be configured to control and arbitrate access to the hardware of computer system 200. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, hypervisor microkernel 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Referring now to FIG. 3, it depicts similar components to those illustrated in FIG. 2; however, in this example configuration, hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2 and host 204. Hypervisor 302 of FIG. 3 can be a stand alone software product, a part of an operating system, embedded within firmware of a motherboard, and/or a portion of hypervisor 302 can be effectuated by specialized integrated circuits.

Figure 4:
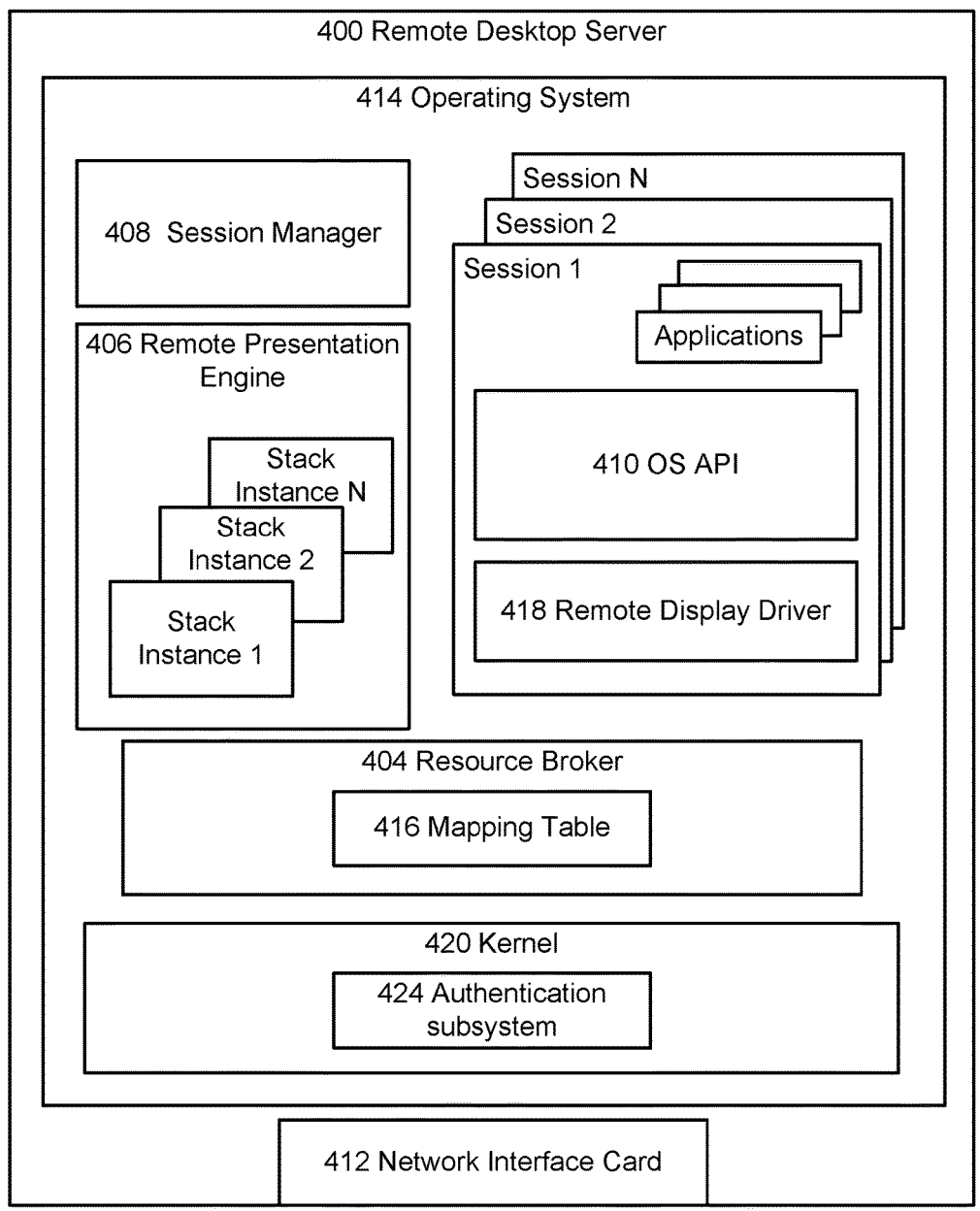
FIG. 4 depicts a high-level block diagram of an exemplary remote desktop server.

Referring now to FIG. 4, it illustrates a remote desktop server 400 that can be used to simultaneously host multiple remote desktop sessions. Briefly, remote desktop server 400 can include circuitry configured to effectuate remote desktop sessions for M clients (where M is also an integer greater than 1). A remote desktop session can generally include an operational environment for a user to execute applications that are stored on remote desktop server 400. In contrast to a computer system running a console session, e.g., a session where a user is logged into a computer physically located with the user, each remote desktop session has limited control of remote desktop server 400. For example, a user may not be able to change certain configuration settings, e.g., registry settings, for operating system 414, install applications, etc.

As shown in the figure, some components of operating system 414 can be run within the context of a session and others can be run as system-wide processes. For example, components such as kernel 420, a file system (not shown), authentication subsystem 424, a scheduler (not shown), resource Broker 404, etc., can be run as system-wide processes. In operation, some components can be instantiated on a per-session basis and interact with the system-wide processes in order to run programs, open/close files, etc.

A session can be spawned in response to receipt of a transmission control protocol ("TCP") Internet protocol ("IP") connection request by network interface card 412. After receipt of the request it can be routed to a TCP port that remote presentation engine 406 is listening on. Next, remote presentation engine 406 can forward connection oriented messages to session manager 408, which can instantiate a remote desktop session for the connection. For example, session manager can generate a session identifier; add the session identifier to a table; assign memory to the session space; generate system environment variables and instances of subsystem processes in memory assigned to the session, e.g., session manager 408 can start an instance of an operating system API 410 and remote display driver 418. Session manager 408 can then cause a logon procedure to start within the session. Meanwhile, remote presentation engine 406 can instantiate a protocol stack instance for the session, e.g., stack instance 1, that can send graphical user interface information for the session to the connecting client and inject data, e.g., mouse clicks, keyboard strokes, etc., received from the client into OS API 410.

In embodiments of the present disclosure, remote desktop server 400 may also receive a uniform datagram protocol ("UDP") IP connection request. Briefly, and described in more detail in subsequent paragraphs, at least a portion of the data for a remote presentation session can be transported via a connectionless oriented channel such as a UDP/IP channel. As such, a UDP/IP channel needs to be established prior to it being used. Accordingly, network interface card 412 can receive the UDP/IP connection request, which can be addressed to a UDP port associated with resource broker 404 and addressed from a UDP port associated with a connection object on a Remote Desktop Gateway (which is described in more detail in subsequent paragraphs). This connection request can be routed to remote presentation engine 406 and validated. Next, resource broker 404 can receive a session identifier from remote presentation engine 406 and store in mapping table 416 in association with the network address for the connection object. Subsequent UDP datagrams from this connection object can be routed to the stack instance associated with this session, i.e., stack instance 1. Subsequent data that is to be sent via a connectionless channel can be routed to resource broker 404, which in turn can send the data in datagrams addressed to the connection object.

After a credential, e.g., a username/password combination, associated with a user is validated, authentication subsystem 424 can generate a system token. This system token can be used whenever the client attempts to execute a process to determine whether the client has the security credentials to run the process. For example, when a process or thread of a session attempts to gain access, e.g., open, close, delete, and/or modify an object, e.g., a file, a setting, or an application, the thread or process can be authenticated by authentication subsystem 424. During an authentication operation, authentication subsystem 424 can check the system token against an access control list associated with the object and determine whether the thread has permission based on a comparison of information in the system token and the access control list. If authentication subsystem 424 determines that the thread is authorized then the thread can be allowed to access the object.

Continuing with the description of FIG. 4, in an embodiment the OS application program interface can include an input subsystem (not shown). The input subsystem in an example embodiment can be configured to receive user input from a client via the protocol stack instance associated with the session and inject the input to OS API 410. The user input can include signals indicative of absolute and/or relative mouse movement commands, mouse coordinates, mouse clicks, keyboard signals, joystick movement signals, etc. Draw commands can be issued by OS API 410 as well as applications to an application program interface such as DirectD3®. The application program interface can issue commands to a graphics driver running in kernel space and/or within the session. A graphics processing unit can generate an image that can be captured by remote display driver 418, which can send the image to the stack instance for the session. The stack instance can in turn send the image to network interface card 412, which can send the image to the client via an private network or a Remote Desktop Gateway server, as described in subsequent paragraphs.

Figure 5:
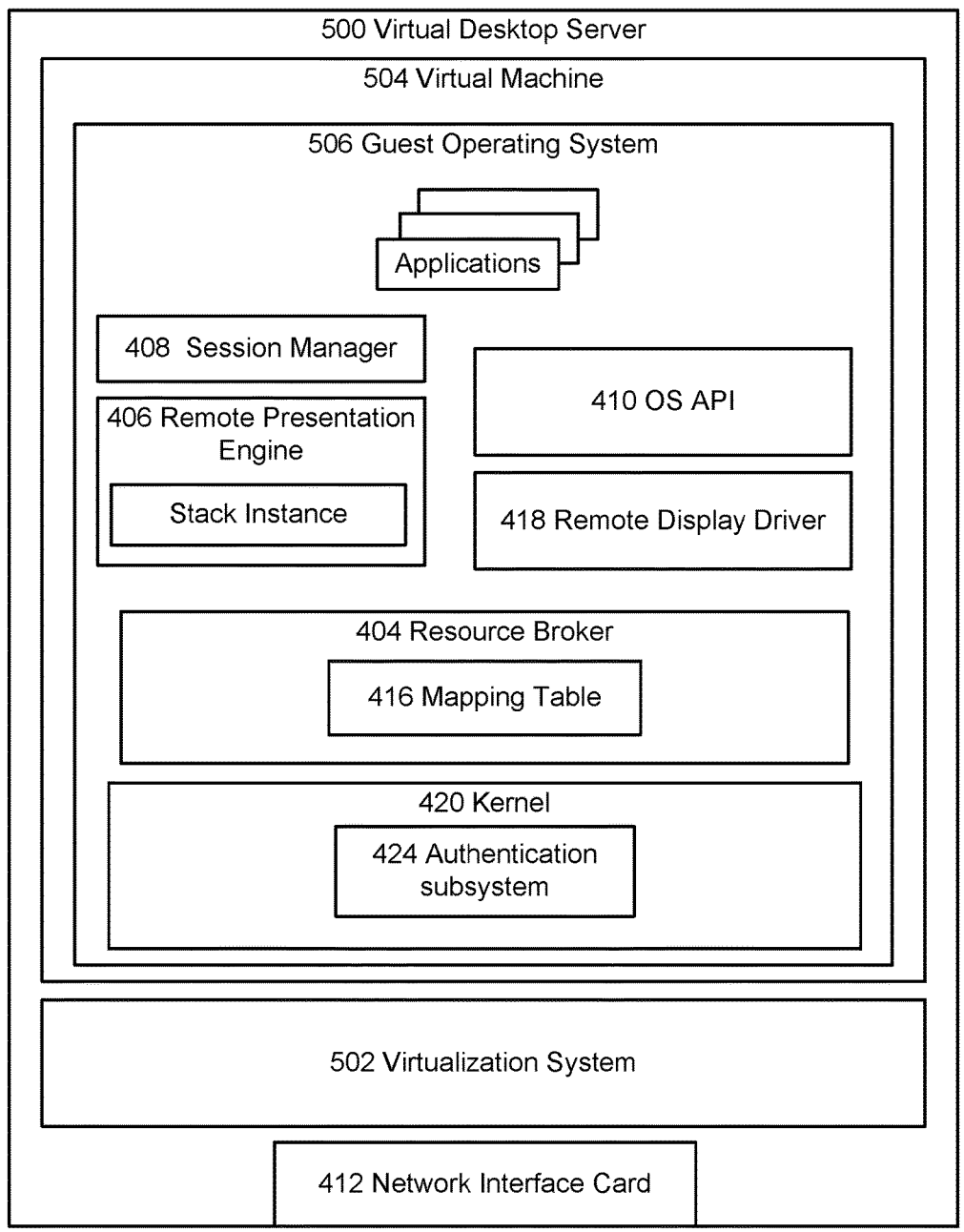
FIG. 5 depicts a high-level block diagram of an exemplary virtual desktop server.

Turning to FIG. 5, it illustrates an exemplary virtualization desktop server 500 configured to conduct a plurality of virtual desktop sessions with a plurality of clients (while one virtual machine is illustrated, virtual desktop server 500 can simultaneously host many virtual machines). FIG. 5 shows virtualization system 502, which can be thought of as a high-level representation of the virtualization platform illustrated by FIG. 2 or FIG. 3. For example, virtualization system 502 can be though of as representing the elements shown in FIG. 2 such as hypervisor microkernel 202 and host 204 as well as the components illustrated as within hypervisor microkernel 202 and host 204. Alternatively, virtualization system 502 can be thought of as representing the components depicted as included within of hypervisor 302 and management OS 304.

A brief comparison of FIG. 4 to FIG. 5 reveals that the components used to effectuate remote desktop sessions can be used to generate virtual desktop sessions. For example, both virtual desktop server 500 and remote desktop server 400 include remote presentation engine 406, session manager 408, resource broker 404, etc. One noticeable difference is that a user conducting a virtual desktop session has a console session and is the only individual accessing the guest operating system. As such, the user logged into guest operating system 506 may be in total control of virtual machine 504. That is, the user can run as an administrator having full rights on guest operating system 506 and does not have to compete with other users logged into guest operating system 506 for access to resources provided by guest operating system 506. A user conducting a remote desktop session, on the other hand, does not have full control of the operating system and interacts with a customized server version of an operating system. Also, a remote desktop session deployment involves configuring a server operating system to allow multiple users to logon to the same operating system as non-administrators to use its resources.

Figure 6:
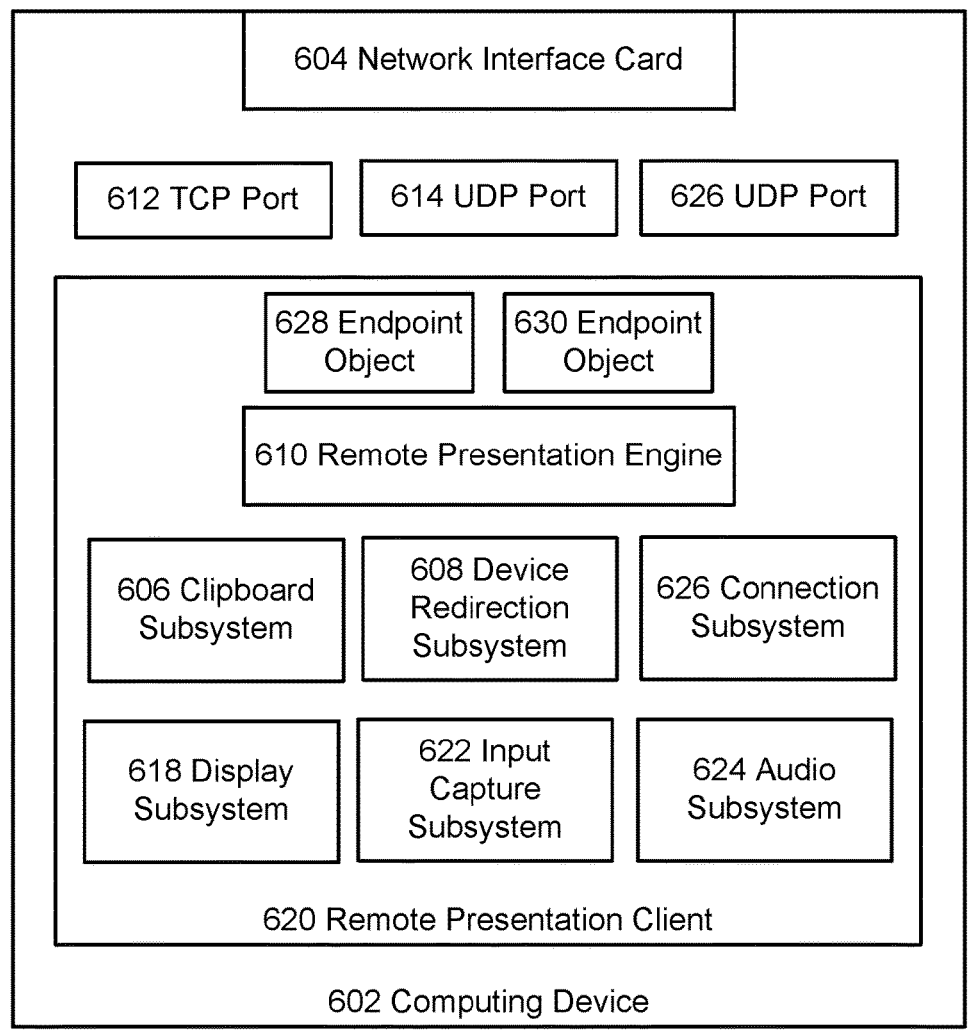
FIG. 6 depicts a high-level block diagram of an exemplary client.
Figure 7:
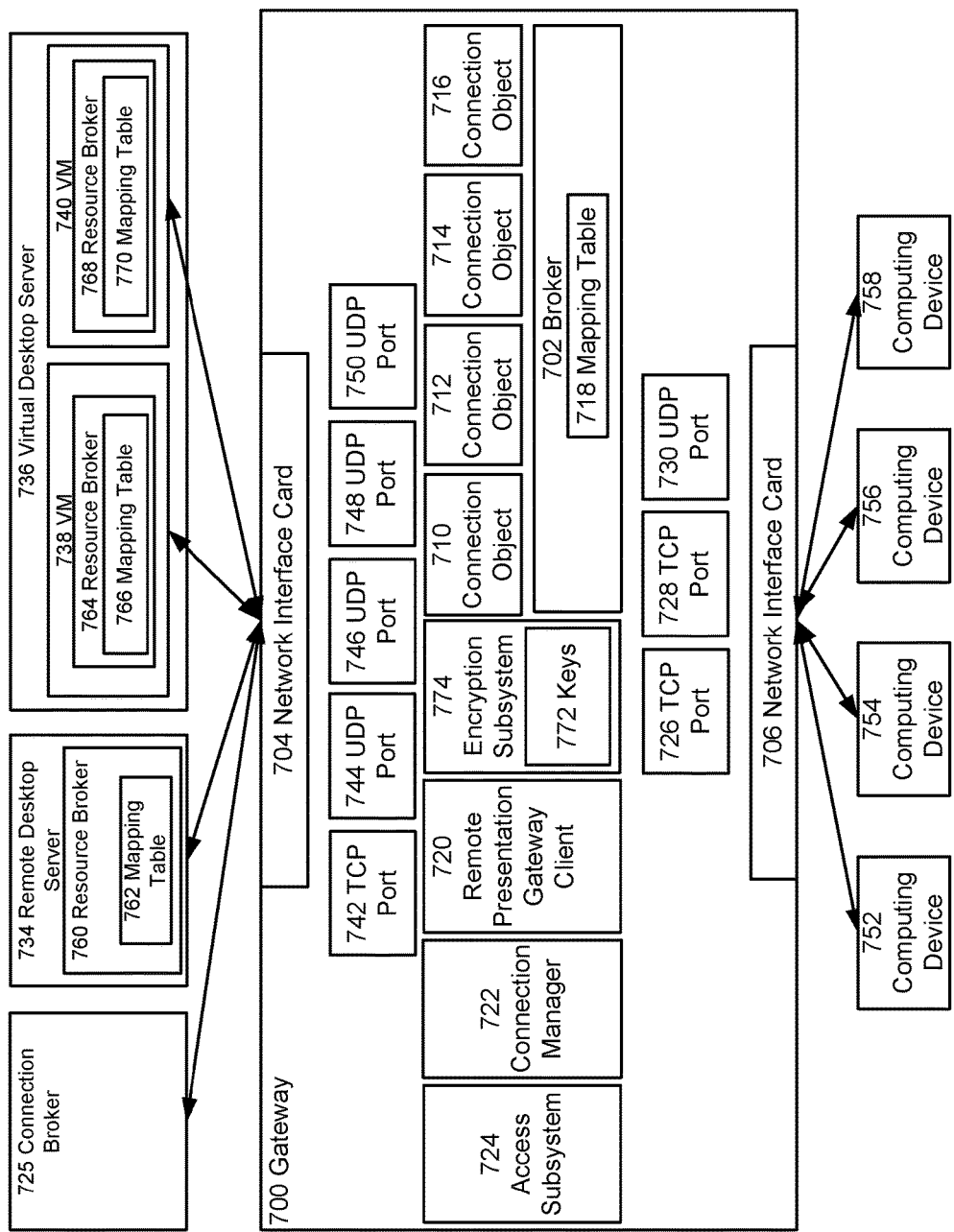
FIG. 7 depicts a high-level block diagram of an operational environment for describing broker techniques.

Referring now to FIG. 6, it illustrates a high-level block diagram of a client that can be used to conduct a remote presentation session with a remote presentation server such as virtual desktop server 500 or remote desktop server 400. In a specific example, computing device 602 can be similar to a desktop computer system, a laptop computer system, a tablet computer system, a mobile device (such as a cellular phone), etc. As such, computing device 602 can include some or all of the components that computer system 100 of FIG. 1 includes.

In addition to the components illustrated with respect to FIG. 1, computing device 602 can include remote presentation client 620. In an embodiment, remote presentation client 620 can be an application stored in memory that can be executed by an operating system. In another embodiment, remote presentation client 620 can be a monolithic application that executes without use of a general purpose operating system. In the former exemplary embodiment, when a user runs remote presentation client 620 it requests resources from an operating system. In the latter exemplary embodiment, remote presentation client 620 may directly control the hardware of computing device 602.

Remote presentation client 620 is illustrated as including multiple subsystems that operate in concert to effectuate the client-side part of a remote presentation session. Namely, remote presentation client 620 can include clipboard subsystem 606, device redirection subsystem 608, display subsystem 618, input capture subsystem 622, and audio subsystem 624. Remote presentation client 620 may include other subsystems and the disclosure is not limited to those illustrated by FIG. 6. Briefly, display subsystem 618 can be used to display images received from the server and audio subsystem 624 can be configured to receive a stream of audio data generated by a music player or the like running on the remote presentation server and output it to speakers attached to computing device 602. Similarly, clipboard subsystem 606 can be configured to allow copy and/or cut-and-paste operations to take place between remote presentation server and the client. For example, a user could copy a document stored on the desktop of a virtual desktop server to a desktop of computing device 602.

In operation, the aforementioned subsystems can use remote presentation engine 610 to communicate with a remote presentation server. For example, input capture subsystem 622 can obtain mouse clicks and keyboard strokes and send them to remote presentation engine 610, which can encode the data according to protocol such as the remote desktop protocol ("RDP") into a RDP message that can be sent it off to the server. Similarly, RDP messages including data for the remote presentation session, e.g., a graphical user interface of a word processing program, can be received by remote presentation engine 610 and decoded. Next, the data can be sent to the appropriate subsystem, e.g., images can be sent to display subsystem 618 and a display of computing device 602 can render the graphical user interface of the remote presentation session.

Similar to the remote presentation servers described above, a connection based channel and one or more connectionless channels can be opened on the client for a remote presentation session. In an embodiment, each connectionless channel can be associated with an endpoint object and each endpoint object can be bound to a different UDP port. For example, and turning to endpoint objects 628 and 630, these objects can be instantiated and configured to route data in datagrams to and from remote presentation engine 610. Endpoint object 628 can bind to UDP port 614 and endpoint object 630 can bind to UDP port 628. As such, each UDP connection will have a different network address. By assigning each connectionless channel to a different network address data indicative of a remote presentation session can be allowed to flow to the remote presentation server through one or more Remote Desktop Gateway servers.

Turning back to endpoint objects 628 and 630, remote presentation engine 610 can maintain a table that maps data from different subsystems to endpoint objects. For example, remote presentation engine 610 may include a table that maps display system 618 to endpoint object 628 and audio subsystem 624 to endpoint object 630. As such, when data sent via UDP datagrams is generated by remote presentation engine 610 it can be routed to the correct endpoint object. Next, the endpoint object can cause a datagram to be generated that includes the data. The datagram can be is addressed to a network address of the Remote Desktop Gateway (or a load balancer) and addressed from the unique network address for the associated endpoint object. Finally, network interface card 604 can send the datagram to the network address. In a specific example, suppose that the table maps display system 618 to endpoint object 628. In this case, if a user generates video, e.g., using a video capture device or the like, messages can be routed to endpoint object 628, which can sent them in UDP/IP packets addressed from the IP address of network interface card 604 and the port number for UDP port 614 to a network address of a Remote Desktop Gateway.

UDP datagrams can also be received by network interface card 604 and routed to the appropriate endpoint object. For example, a datagram addressed to UDP port 614 or UDP port 626 can be received by network interface card 604 and routed through the network stack to the appropriate endpoint object. After receiving a message stored in the datagram, the endpoint object can route it to remote presentation engine 610. Next, remote presentation engine 610 can decode the message and pass the data stored therein to the appropriate subsystem for processing.

Turning now to FIG. 7, it illustrates a Remote Desktop Gateway server (gateway 700) that can be used to allow clients (computing devices 752-758) coupled to a public network, such as the Internet, to communicate with one or more remote presentation servers, e.g., virtual desktop server 736 and/or remote desktop server 734, which can be connected to a private network. Briefly, Remote Desktop Gateway 700 can include components similar to computer system 100 of FIG. 1. As an aside, and described in more detail with respect to FIG. 9 and FIG. 10, a corporate entity can use multiple Remote Desktop Gateway computer systems for load balancing and/or traffic optimization purposes. Each Remote Desktop Gateway illustrated in FIG. 9 and FIG. 10 can be functionally equivalent to Remote Desktop Gateway 700 and one is illustrated in FIG. 7 for the sake of simplicity.

Discussed briefly above, at least a portion of the data for a remote presentation session can be transported via a connectionless channel. Generally, an implementer can select any type of data to be sent via a connectionless channel. However, in an exemplary embodiment, an implementer may choose to separate data into data that can tolerate loss and data that cannot and send data that cannot tolerate loss via TCP based IP packets and data that can tolerate loss via UDP datagrams. Specific examples of data that can be sent via a connectionless channel can include data indicative of audio (music played on a server and streamed to a client), video (Flash video, HTML 5 video, etc.), images indicative of a graphical user interface (a bitmap indicative of a desktop), etc. Specific examples of data that can be sent via a connection oriented channel can include data indicative of keyboard strokes, mouse movements, cut-and-paste data, etc.

One reason for sending at least a part of the data for a remote presentation session via UDP datagrams is because UDP traffic can be transported faster than TCP traffic. For example, UDP based packets are sent without establishing a connection and dropped packets are not resent. In effect, data is simply packaged into a UDP datagram; encapsulated in an IP packet; and sent to a destination IP address/port number combination. The need for sending data quickly may arise when data that is sensitive to lag is being transported, such as data indicative of audio, video, etc. A downside to using UDP datagrams is that there no guarantee that each datagram will be delivered. As such, lost data is not retransmitted.

Turning back to the description of FIG. 7, broker 702 can be used to configure Remote Desktop Gateway 700 to handle both TCP and UDP traffic for a remote presentation session. For example, broker 702 can be configured to listen on UDP port 730, which can be used by computing devices 752-758 to send datagrams to Remote Desktop Gateway 700. Accordingly, Remote Desktop Gateway 700 can use a single UDP port to receive datagrams sent from a plurality of clients. By multiplexing UDP packets through a single UDP port rather than opening a UDP port on Remote Desktop Gateway 700 for each client, the attack surface of Remote Desktop Gateway 700 is reduced and the administration costs associated with tracking open ports is minimized.

After datagrams are received by broker 702, it can demultiplex UDP datagrams into separate streams using mapping table 718 and connection objects 710-716. Similar to endpoint objects, an instance of a connection object can be instantiated for each connectionless oriented channel established with a client. For example, FIG. 7 shows connection objects 710-716, each of which may be associated with a connectionless channel (in the illustrated example each computing device 752-758 is shown as having one connectionless channel; however, a client may have one or more connectionless oriented channels on a Remote Desktop Gateway and each connectionless channel can be associated with a connection object). When a UDP based connection request is received by Remote Desktop Gateway 700, broker 702 can instantiate a connection object and assign it a socket handle. Once instantiated, a connection object can bind to a port associated with network interface card 704, i.e., a port on the private IP network. Briefly, network interface card 704 can be coupled to a private network and have a private IP address, i.e., network interface card 704 can be connected to a network that uses a private IP address space that is not globally delegated nor can devices operating on the private IP address space be directly accessed by a public network such as the Internet. In addition, each connection object can be instantiated with the IP address/port number combination for the remote presentation session. As such, each connection object can include information that enables it to route data to the appropriate remote presentation session.

In a specific example, suppose that a UDP based connection request is received from computing device 752 and the connection request indicates that computing device 752 is attempting to connect to remote presentation server 734. In response to receipt of this request, broker 702 can instantiate connection object 710 with the network address for remote presentation server 734 and connection object 710 can bind a private UDP port (e.g., UDP port 744). As such, connection object 710 can be configured to listen on a private UDP port for UDP datagrams sent by remote desktop server 734 that are for computing device 752 and send UDP datagrams to the network address of remote desktop server 734.

In an embodiment, broker 702 can use mapping table 718 to determine how to route UDP datagrams from clients to the correct connection object and vice versa. Turning to FIG. 8, it illustrates a specific example of the type of information that can be stored in mapping table 718. As shown by the figure, in an embodiment mapping table 718 can include a connection identifier for each client. The connection identifier can be formed directly from a network address for each client, e.g., an IP address port number combination for the client and a socket handle for the connection object that is emulating a connection between gateway 700 and the remote presentation session. Alternatively, a connection identifier can be assigned by the gateway as, for example, a unique numerical value as illustrated in mapping table 718 of FIG. 8. In addition to the foregoing, mapping table 718 can include information such as the session identifier, the username/password combination used by client, the network address for the associated remote presentation server, etc. Some or all of this information in mapping table 718 can be used to determine where to route data contained in a given datagram.

Similarly, resource mapping table 762 can also include a connection identifier, a Remote Desktop Gateway address, e.g., a private IP address port number combination, used by an associated connection object and a session identifier generated by the remote presentation server. Resource broker 764 and 768 can be similar to resource broker 760; however, resource broker 764 and 768 may host a single session since each virtual desktop session runs in its own virtual machine having its own virtual network interface card. In the illustrated example, each client is illustrated as having one UDP channel; however, each client may have multiple channels established through a Remote Desktop Gateway. As such, mapping table 718, 762, 766, and/or 770 may have routing information for multiple connectionless channels that are associated with the same connection identifier.

Continuing with the description of FIG. 7, in an embodiment Remote Desktop Gateway 700 can use access subsystem 724, remote presentation gateway client 720, and encryption subsystem 774 to establish a remote presentation session. In an exemplarily configuration, access subsystem 724 can determine whether to forward a connection request to a remote presentation server. As such, access subsystem 724 acts as a first gatekeeper.

Figure 10:
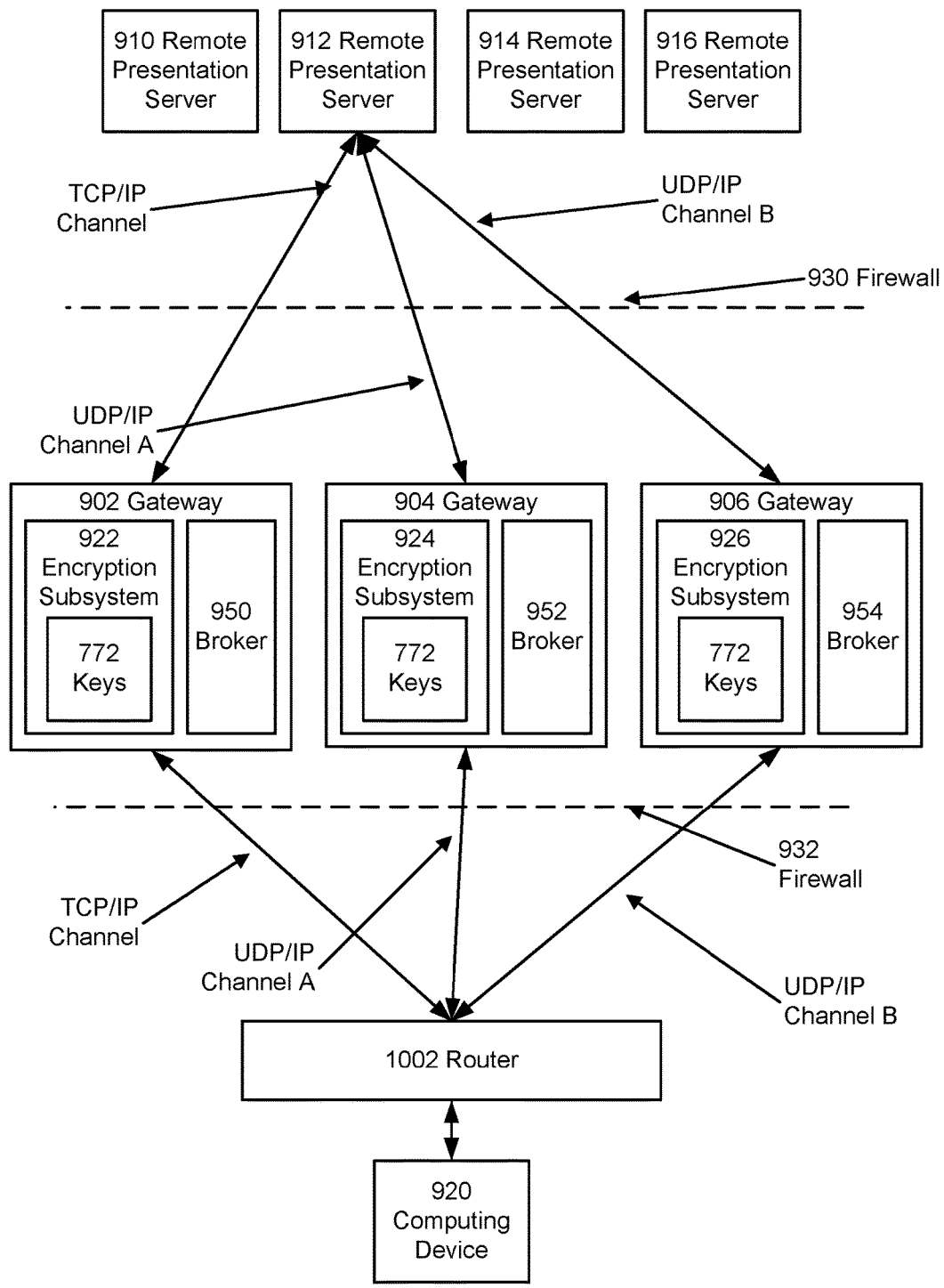
FIG. 10 depicts an alternative operational environment for describing the span-out model for effectuating remote presentation sessions.

Turning briefly to FIG. 9 and FIG. 10, these figures illustrate an embodiment where connection oriented channels and connectionless oriented channels can span-out to different gateways. In the exemplary configuration shown by FIG. 9, an entity may maintain a group of remote presentation servers (e.g., remote presentation servers 910-916) located behind a first firewall, i.e., firewall 930. FIG. 10 is similar to FIG. 9 in that it shows a span-out model. One notable difference is that router 1002 is used to protect gateways 902-906. As such, a group of Remote Desktop Gateway servers (e.g., gateways 902-906) can be maintained behind a second firewall, i.e., firewall 932. In this example, an administrator could set router 1002 to act as a load balancer and it can use round-robin, IP affinity, and/or cookie based load balancing techniques. Accordingly, router 1002 may group connection oriented channels and connectionless oriented channels on the same Remote Desktop Gateway using such a load balancing technique or cause the channels to span-out across the Remote Desktop Gateways as shown by the figure.

Figure 11:
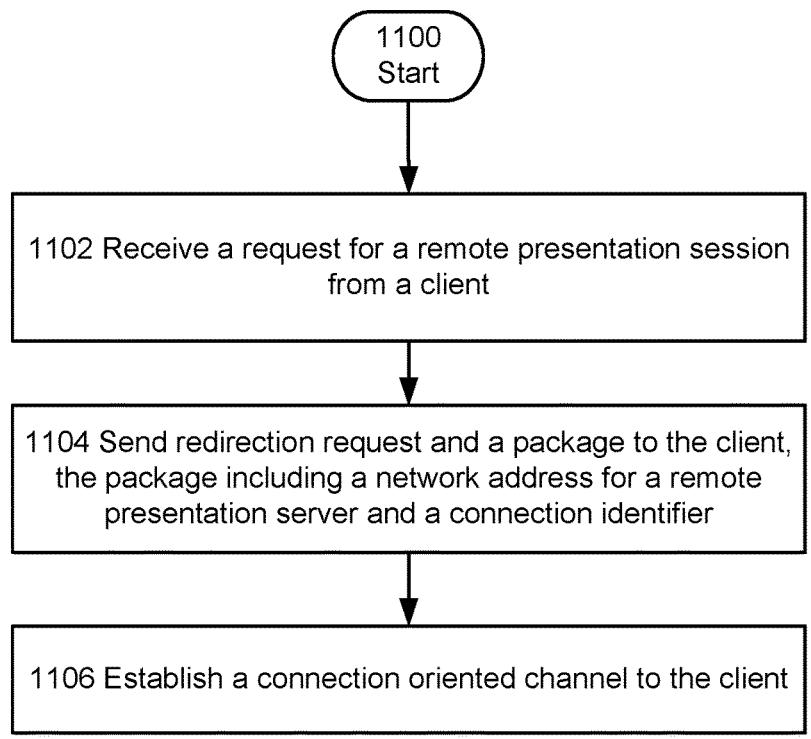
FIG. 11 illustrates an operational procedure for establishing a connection based channel with a first Remote Desktop Gateway.

Turning now to FIG. 11, it illustrates an operational procedure for establishing a connectionless oriented channel between a client and a remote presentation server. Operation 1100 begins the operational procedure and operation 1100 illustrates that a Remote Desktop Gateway such as Remote Desktop Gateway 902 can include circuitry configured to receive a request for a remote presentation session from a client. For example and turning to FIG. 9, Remote Desktop Gateway 902 can include an instance of an access subsystem, which can receive a connection request for a remote presentation session from a network interface card.

Suppose that a user operating a client, such as computing device 920 (which may have components similar to computing device 602) desires a remote presentation session. Here, the user may open a web-browser and navigate to a webpage associated with the entity offering remote presentation services that includes a link for establishing a session. In response to a selection of the link, the client can send a HTTPS connection request to an IP address TCP port number combination associated with access subsystem on Remote Desktop Gateway 902. The network interface card of Remote Desktop Gateway 902 can receive one or more packets indicative of a connection request. A network stack can extract the TCP packet from the IP packet; extract the payload (i.e., a HTTPS message) from the TCP packet; and route the payload to access subsystem.

Access subsystem can receive the connection request and extract a username/password combination from the HTTPS message. The username/password combination can be authenticated and access subsystem can allow a properly authenticated connection to connect to the requested resource. In a typical, remote presentation session, the requested resource will initially request a connection to a connection broker 725 or the like. The connection broker 725, will select a suitable remote desktop server 734, virtual desktop server 736, or Remote Presentation Server 912 to host the session. For example, if the request indicates that a remote desktop session or a remote application session is desired, the connection broker 725 will search a database that includes IP address port number combinations for remote desktop servers to find a remote desktop server. Similarly, if the request is for a virtual desktop session, connection broker 725 can search a database that includes network identifiers for virtual desktop servers to find a virtual desktop server. In a specific example, suppose that the request is for a remote desktop session and connection broker 725 selects remote presentation server 912, e.g., remote desktop server 734 to host the session. For example, connection broker 725 can generate a redirection request that causes the client to send one or more connection requests to one or more IP address port number combinations for a Remote Desktop Gateway to connect to remote desktop server 734.

After establishing the TCP/IP connection with the remote desktop server 734, in accordance with an aspect of the invention, it may be desirable to open a second connection with the remote desktop server 734 in accordance with a particular session established between the client on computing device 752 and the remote desktop server 734. As such, a request will be made to the gateway to open a second connection to the remote desktop server 734. The request can originate from the remote desktop server 734, the computing device 752, or both.

In addition to a TCP/IP based connection request, the second connection request may be for one or more UDP based channels to gateway 700. In an embodiment, remote presentation client 620 can be configured to use one connectionless oriented channel to transport data that can tolerate loss; however, in an alternative embodiment, remote presentation client 620 can be configured to open multiple connectionless oriented channels. In a specific example, remote presentation client 620 can open a connectionless oriented channel for audio, a connectionless oriented channel for video, and/or a connectionless oriented channel for a graphical user interface. Here, endpoint objects can be spawned and each endpoint object can bind to a port. After successfully binding to ports, the endpoint objects can send connection requests to gateway 700 via UDP datagrams.

After the TCP connection is established, access subsystem 724 can generate a package (e.g., a HTML cookie, an XML document, etc.) that can include configuration information to start a session. For example, the configuration information can include the private network address used by remote desktop server 734, a copy of the username/password combination, a connection identifier, and a timestamp. This information can be encoded within a package and then digitally signed by encryption subsystem 774 using a copy of a key. For example, encryption subsystem 774 can generate a hash of the data stored in the package and encrypt the hash with an encryption key. The encrypted hash, i.e., the digital signature, can be embedded in the package and the package can be encrypted.

Turning briefly to operation 1104, it shows that a Remote Desktop Gateway such as Remote Desktop Gateway 902 can include circuitry configured to send a redirection request and package to the client, the package including a network address for a remote presentation server and a connection identifier. For example, after a host is selected the access subsystem can generate a package (e.g., a HTML cookie, an XML document, etc.) that can include configuration information to start a session. For example, the configuration information can include the private network address used by remote presentation server 912, e.g., remote presentation server 734, a copy of the username/password combination, a connection identifier, and a timestamp. This information can be encoded within a package and then digitally signed by encryption subsystem 922 using a copy of a key. For example, encryption subsystem 922 can generate a hash of the data stored in the package and encrypt the hash with an encryption key. The encrypted hash, i.e., the digital signature, can be embedded in the package and the package can be encrypted. In an embodiment, each Remote Desktop Gateway associated with an entity, e.g., an organization, company, agency, etc., can include the same encryption and decryption keys so that each Remote Desktop Gateway can validate digital signatures generated by other Remote Desktop Gateways in the organization. In this regard, channels that span-out across different Remote Desktop Gateways can be validated without having to send keys over a network.

In addition to encrypting the package, the access subsystem can be configured to determine a number of channels to open. For example, the access subsystem can use a round robin algorithm or a policy that assigns different types of connectionless channels to specific Remote Desktop Gateways to assign the channels to Remote Desktop Gateways, e.g., a policy may be used that causes access the subsystem of Remote Desktop Gateway 902 to assign connectionless channels for transporting graphical user interfaces to a first Remote Desktop Gateway, e.g., Remote Desktop Gateway 904, and connectionless channels for transporting audio to a second Remote Desktop Gateway, e.g., Remote Desktop Gateway 906.

In a specific example, two channels may be opened on two different Remote Desktop Gateways: one for connection oriented traffic and one for connectionless oriented traffic. In another specific example, multiple channels may be opened on different Remote Desktop Gateways: one for connection oriented traffic and O number of connectionless oriented channels (where O is an integer greater than 1). In this configuration, a connectionless oriented channel, e.g., a UDP channel, may be opened for each type of traffic sent via UDP datagrams. For example, a channel may be opened to transport data indicative of a graphical user interface, a channel may be opened to transport data indicative of video, and a channel may be opened to transport data indicative of audio.

In a configuration similar to FIG. 9, an access subsystem running on Remote Desktop Gateway 902 can select an IP address port number combination for each channel. For example, the access subsystem could use IP affinity or cookie based load balancing techniques to assign each channel to the same Remote Desktop Gateway. Alternatively, the access subsystem could assign the TCP channel to the IP address port number combination for Remote Desktop Gateway 902, a first UDP channel to the IP address port number combination used by a broker 952, and second UDP channel to the IP address port number combination used by a broker 954 or any other combination.

In another alternative configuration, the access system may generate a redirection request that includes the network address of router 1002 of FIG. 10 and a number of connections to open. In this example, router 1002 can be used to cause the different channels for a remote presentation session to be hosted by the same Remote Desktop Gateway or span-out to different Remote Desktop Gateway computer systems by using a round robin load balancing algorithm or the like.

Next, the encrypted package and redirection request can be encoded into a response message and sent by a network interface card of Remote Desktop Gateway 902 to the client, e.g., computing device 920 in a specific example. Computing device 920 can include a network stack that can process the IP packet(s) and extract the response message. The package can then be routed to a connection subsystem and stored in a computer-readable storage medium, e.g., the encrypted cookie can be stored in random access memory. A remote presentation client running on computing device 920 can then parse the redirection request and send a connection message to the IP address port number combinations in the request message. In this example, the remote presentation client can cause the client to send a connection request via TCP/IP packets to Remote Desktop Gateway 902.

In addition to a TCP/IP based connection request, the remote presentation client of computing device 920 can send one or more UDP based channels to Remote Desktop Gateways 904 and 906 or router 1002. In an embodiment, the remote presentation client can be configured to use one connectionless oriented channel to transport data that can tolerate loss; however, in an alternative embodiment, the remote presentation client can be configured to open multiple connectionless oriented channels. In a specific example, the remote presentation client can open a connectionless oriented channel for audio, a connectionless oriented channel for video, and/or a connectionless oriented channel for a graphical user interface. Here, endpoint objects can be spawned and each endpoint object can bind to a port. After successfully binding to ports, the endpoint objects can send connection requests to Remote Desktop Gateways 904 and 906 or router 1002 via UDP datagrams.

In a specific example and referring to FIG. 6 in conjunction with FIG. 9, suppose that computing device 602 is computing device 920 in this example. Here, endpoint object 628 can be instantiated and associated with a network address for broker 952 and endpoint object 630 can be instantiated and associated with a network address for broker 954. In this example, network interface card 604 can send a first connection request via a first datagram addressed from the network address for endpoint object 628 to the network address for broker 952 and network interface card 604 can send a second connection request via a second datagram addressed from the network address for endpoint object 630 to the network address for broker 954.

In another specific example, and referring to FIG. 10, in this specific example endpoint objects 628 and 630 may be instantiated and associated with the same network address for router 1002. Router 1002 may treat these as separate requests because they are addressed from different network addresses and select Remote Desktop Gateway(s) to forward the requests to using a load balancing algorithm.

Referring to operation 1106 of FIG. 11, it indicates that a Remote Desktop Gateway can include circuitry configured to establish a connection oriented channel to the client. For example a network interface card of Remote Desktop Gateway 902 can receive the connection request and route it to an instance of remote presentation gateway client running on Remote Desktop Gateway 902. The remote presentation gateway client in turn can obtain the connection message and route it to connection manager. Next, the connection manager can send the package to encryption subsystem 922, which can decrypt the encrypted package using a key and validate a digital signature stored therein. In addition, the connection manager can compute the difference between the timestamp in the decrypted package and the current time and compare the difference to a threshold, e.g., 5 minutes.

In the instance that the digital signature is valid, and the timestamp difference is less than the threshold, the connection manager on Remote Desktop Gateway 902 can validate the package and initiate a connection sequence between Remote Desktop Gateway 902 and the client, e.g., computing device 920. For example, the connection manager can generate a socket handle for the connection and associate it with the connection identifier. After the TCP/IP connection sequence completes, a message can be sent back to the client indicating that the connection oriented channel was established.

The remote presentation gateway client running on Remote Desktop Gateway 902 can route a connection request to remote presentation server 912 that can include a copy of the username/password combination for the user. After the connection between Remote Desktop Gateway 902 and the remote presentation server 912 is completed, the remote presentation server 912 can validate the username/password combination; assign the session a session identifier; and start a session. As an aside, after the TCP/IP channel is opened data can flow from the remote presentation server 912 to computing device 920. For example, user input data such as keyboard strokes or mouse movement coordinates can be encoded into a message by the client and sent via a TCP/IP channel to Remote Desktop Gateway 902. The connection manager can receive the message and route it to remote presentation server 912, which can inject the user input data into the appropriate session. Similarly, suppose that a user copies a document from the remote desktop to computing device 920. In this example, the document can be sent via one or more TCP/IP packets from remote presentation server 912 to Remote Desktop Gateway 902 and then routed via one or more TCP/IP packets to computing device 920.

Figure 12:
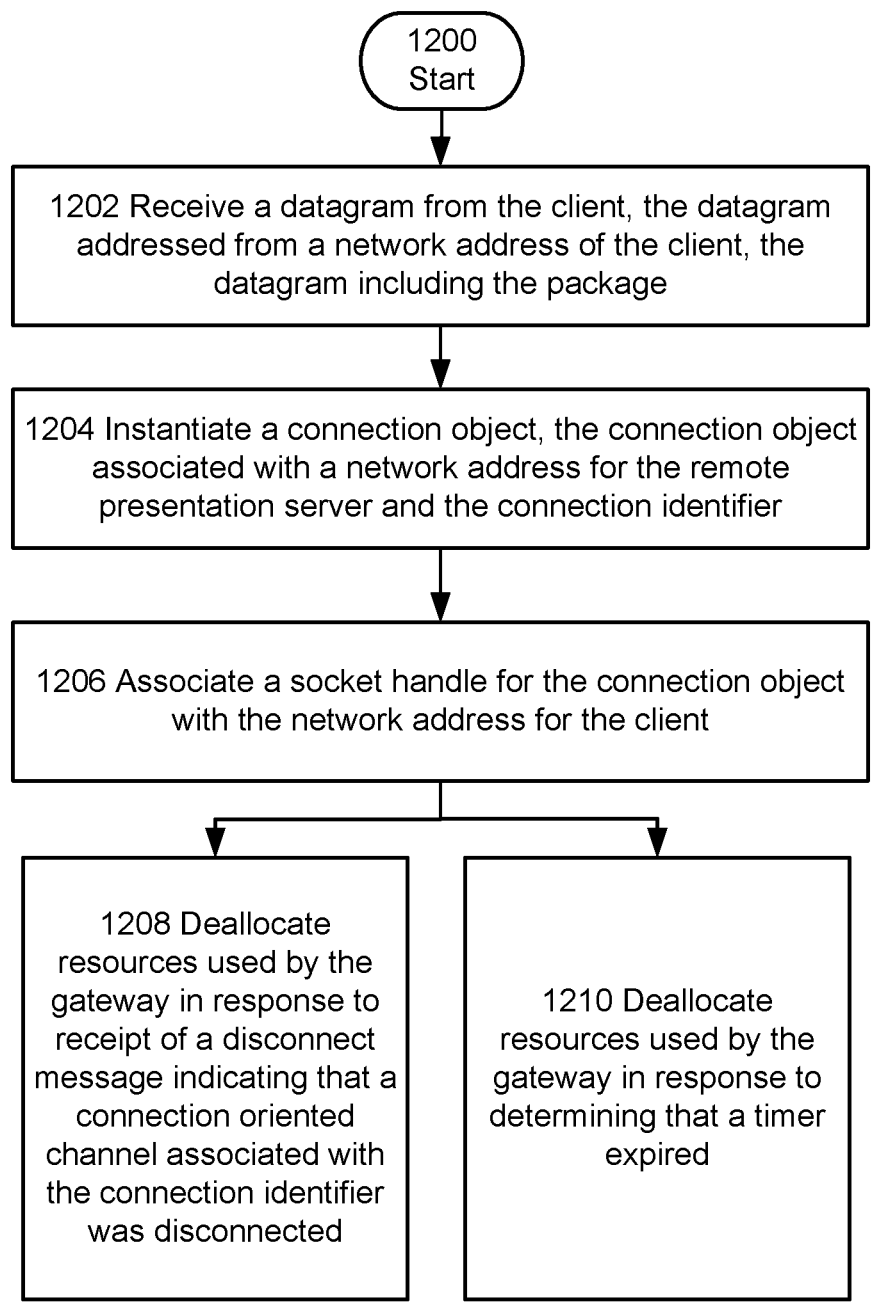
FIG. 12 illustrates an operational procedure for establishing a connectionless channel with a second Remote Desktop Gateway.

Turning now to FIG. 12, it illustrates an operational procedure that can be executed by a gateway similar to Remote Desktop Gateway 904 or 906 to establish a connectionless oriented channel. Operation 1200 begins the operational procedure and operation 1202 indicates that a Remote Desktop Gateway can include circuitry configured to receive datagram from the client, the datagram addressed from a network address of the client, the datagram including the package. In this example, suppose that Remote Desktop Gateway 904 receive a connection request sent via UDP packets and it can be routed to broker 952. In this example, broker 952 can detect the connection request and route the encrypted package to an instance of connection manager running on Remote Desktop Gateway 904. Next, the connection manager can route the package to encryption subsystem 924, which can use its copy of a key to validate the package. Broker 952 can receive the package and add the connection identifier to an instance of a mapping table in association with the network address of the client, e.g., computing device 920. At this point, a connectionless channel, e.g., UDP/IP channel A, is established between Remote Desktop Gateway 904 and computing device 920. Remote Desktop Gateway 906 can perform similar operations to establish UDP/IP channel B between Remote Desktop Gateway 906 and computing device 920. As an aside, the connection identifier can be used to link the different channels to the session. As such, an administrator or the like could query the Remote Desktop Gateways maintained by the entity, e.g., Remote Desktop Gateways 902, 904, and 906, for information about the channels it is hosting and receive information that indicates that a TCP channel is open for computing device 920 on Remote Desktop Gateway 902 as well as information that indicates that UDP channel A is open for computing device 920 on Remote Desktop Gateway 904 and UDP channel B is open on Remote Desktop Gateway 906.

Turning to operation 1204 of FIG. 12, it indicates that a Remote Desktop Gateway can additionally include circuitry configured to instantiate a connection object, the connection object associated with a network address for the remote presentation server and the connection identifier. For example, broker 952 and 954 on Remote Desktop Gateways 904 and 906 can instantiate a connection object for the channel it is hosting for the remote presentation session. Each broker 952 and 954 can pass the connection object the network address for the remote presentation server, e.g., remote presentation server 912, used by a resource broker running thereon.

Operation 1206 indicates that a Remote Desktop Gateway can additionally include circuitry configured to associate a socket handle for the connection object with the network address for the client. For example, an operating system running on Remote Desktop Gateway 904 can generate a socket handle for the connection object and broker 952 can store it in association with the connection identifier and the network address for the client. The connection object can bind to a socket associated with network interface card having a private IP address. Remote Desktop Gateway 906 can perform similar operations.

After receiving a signal indicating that the bind operation was successful, the connection object can send the connection request to remote presentation server 912. In a specific example, the connection request can include the username/password combination provided by the user of the client, a client access license, configuration settings for the session, i.e., information that indicates whether device redirection is enabled, and other configuration settings. A network interface card of remote presentation server 912 can receive the connection request and route it to a UDP port that a resource broker is bound to. The resource broker can receive the connection request; detect the connection request; and forward the payload of the packet, e.g., the remote desktop session connection request, to an instance of a remote presentation engine running on remote presentation server 912. The remote presentation engine can determine that the payload is similar to a connection request received via TCP/IP packets and send the session identifier to the resource broker. The resource broker can store the session identifier in association with the network address used by the connection object. After this set of operations is completed a connectionless channel is established between Remote Desktop Gateway 904 and remote presentation server 912. As an aside, Remote Desktop Gateway 906 can execute similar operations to establish a connectionless channel to remote presentation server 912.

Continuing with the description of FIG. 12, operation 1208 shows that a Remote Desktop Gateway server, can include circuitry configured to deallocate resources used by the connection a Remote Desktop Gateway in response to receipt of a disconnect message indicating that a connection oriented channel associated with the connection identifier was disconnected. For example, and referring to FIG. 9 or FIG. 10 sometime after a connectionless oriented channel is opened to the client, the user or an administrator may disconnect the remote presentation session. For example, Remote Desktop Gateway 902 may receive a finish ("FIN") packet directing it to tear-down the TCP connection. In response to receipt of a FIN packet, Remote Desktop Gateway 904 can send an acknowledgment ("ACK") and close the connection after a short period of time.

Since remote presentation session use connectionless channels in exemplary embodiments, a remote presentation engine running on computing device 920 or resource broker running on remote presentation server 912 can generate disconnect the UDP based connections. For example, a remote presentation engine or a resource broker can generate a list of connectionless oriented channels associated with the connection identifier and send a disconnect message for each channel to Remote Desktop Gateway 904 and/or 906. Each Remote Desktop Gateway can receive the disconnect messages and can deallocate resources used to effectuate the connectionless oriented channels. For example, broker 952 and 954 can receive the disconnect message and a collector process can reclaim memory used to store connection objects, network sockets, etc. In addition, the associate entries within mapping tables can be deleted.

Since UDP is connectionless and unreliable, a Remote Desktop Gateway can include an additional technique that can be used to reclaim resources. For example, operation 1210 indicates that a Remote Desktop Gateway can additionally include circuitry configured to deallocate resources used by the Remote Desktop Gateway in response to determining that a timer expired. For example, and turning to FIG. 9 or 10, broker 952 and 954 can maintain a timer for each connection identifier and refresh the timer each time it processes a UDP packet associated with the connection identifier. In the instance that the timer expires, broker 952 or 954 can reclaim the resources that are associated with the connection identifier.

In a specific example, suppose that the timer is set to 5 minutes. In this example, suppose that an administrator decides to disconnect the remote presentation session for computing device 920 and sends a signal to Remote Desktop Gateway 902. Remote Desktop Gateway 902 can tear-down the TCP connection and remote presentation server 912 can send disconnect messages to Remote Desktop Gateways 904 and 906. Suppose that the disconnect message sent to Remote Desktop Gateway 904 is lost en route. Here, broker 952 may maintain a timer that is reset each time a UDP packet is receive that is associated with a connection identifier associated with computing device 920. For example, when a UDP packet is received by a connection object associated with the connection identifier it can be routed to broker 952. Broker 952 can determine the network address for the client and determine the connection identifier associated with the connection object. Broker 952 can then reset the timer and send the datagram to the client. After the timer expires, i.e., because the remote presentation session has been terminated in this example, broker 952 can reclaim the resources associated with the connection identifier.

Figure 13:
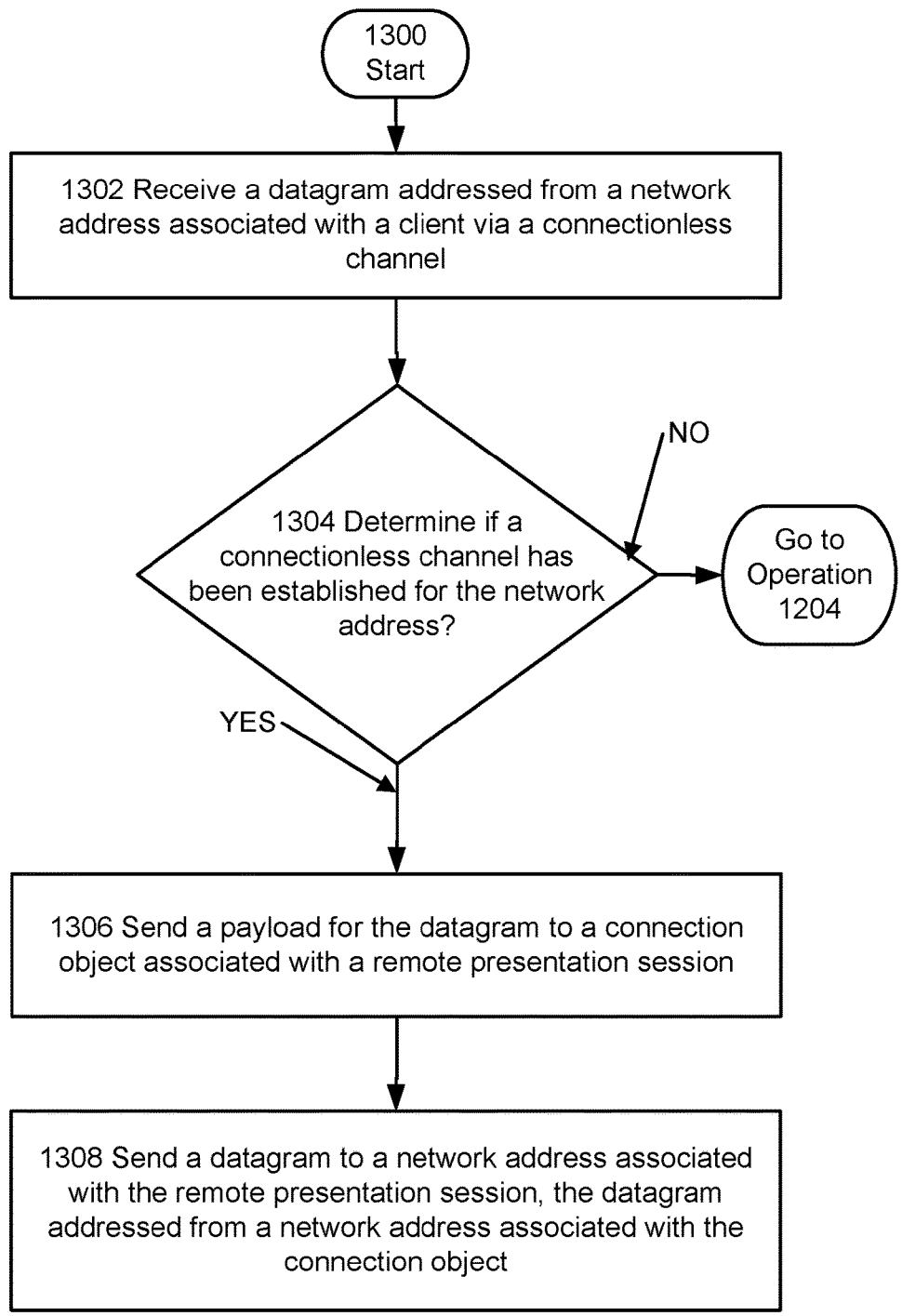
FIG. 13 illustrates an operational procedure for transporting datagrams between a client and a server via a Remote Desktop Gateway.

Turning now to FIG. 13, it shows an operational procedure that can be executed by a Remote Desktop Gateway to transport session data from a client to a remote presentation server via a connectionless oriented channel. Operation 1300 begins the operational procedure and operation 1302 indicates that a Remote Desktop Gateway can include circuitry configured to receive a datagram that is addressed from a network address associated with a client. For example, a network interface card of Remote Desktop Gateway 904 can receive one or more UDP datagrams from a client, such as computing device 920. UDP datagrams can be extracted from the IP packets and routed to broker 952.

Continuing with the description of FIG. 13, decision point 1304 indicates that a Remote Desktop Gateway can include circuitry configured to determine if a connectionless channel has been established for the network address associated with the client. For example, when a client such as computing device 920 sends a UDP datagram to Remote Desktop Gateway 904, the packet can include a network address, e.g., the IP address/port number, that an endpoint object on computing device 920 is using to communicate with Remote Desktop Gateway 904. The payload of the datagram can be routed to broker 952, which determine whether the packet includes a connection request. If it does not, broker 952 can use the network address associated with the endpoint to determine the socket handle for the connection object handling datagrams from this client.

In the instance that an entry exists, and turning to operation 1306, the payload for the datagram can be routed to the associated connection object. For example, a Remote Desktop Gateway can include circuitry configured to send the payload of the datagram to a connection object that is associated with a remote presentation session.

Turning to operation 1308, it shows that in an embodiment the Remote Desktop Gateway can also include circuitry configured to send a datagram to a network address associated with the remote presentation session, the datagram addressed from a network address associated with the connection object. For example a connection object on Remote Desktop Gateway 904 can send a request to a network stack to send the payload in a UDP datagram to the network address for remote presentation server 912.

A network interface card of remote presentation server 912 can receive the UDP datagram addressed from the private IP address of a network interface card of Remote Desktop Gateway 904 and the port number associated with the connection object and it can be routed to an instance of resource broker. The resource broker can parse the source address field and determine that the UDP based packet was received from a connection object.

Figure 14:
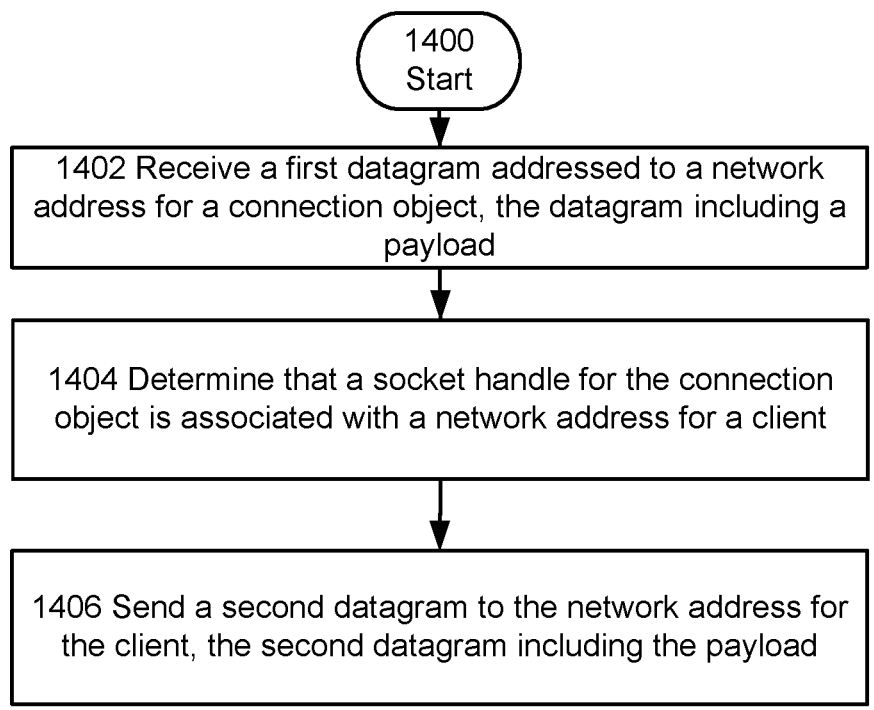
FIG. 14 illustrates an operational procedure for transporting datagrams between a client and a server via a Remote Desktop Gateway.

Turning now to FIG. 14, it illustrates an operational procedure that can be used to route a payload via a connectionless channel between a remote presentation server to a client. Operation 1400 begins the operational procedure and operation 1402 indicates that a Remote Desktop Gateway can include circuitry for receiving a first datagram addressed to a network address for a connection object, the datagram including a payload. For example, a network interface card of Remote Desktop Gateway 904 can receive a UDP datagram from remote presentation server 912.

In a specific example, suppose remote presentation server 912 is effectuating a remote desktop session for computing device 920. In this example, the remote desktop session can encode data indicative of a graphical user interface, e.g., an image of a desktop, video, e.g., HTML 5 video embedded within a webpage, audio, e.g., a song being played on the remote desktop server, etc., into a remote desktop message. Next, the message could be sent to a resource broker along with a session identifier. The resource broker can use a mapping table to determine the network address for Remote Desktop Gateway 904 and cause a UDP datagram including the remote desktop message to be sent to the determined network address.

Turning back to FIG. 14, operation 1406 indicates that a Remote Desktop Gateway can include circuitry configured to determine that a socket handle for the connection object is associated with a network address for a client. For example, a connection object on Remote Desktop Gateway 904 can send a signal to broker 952 indicating that a remote desktop message was received. Broker 952 can obtain the payload and use the socket handle for a connection object to search a mapping table on Remote Desktop Gateway 904. Broker 952 can send a send request to a network protocol stack to send the payload to the network address for computing device 920. The network stack can generate a UDP datagram having the network address used by broker 952 set as the source address and the network address of computing device 920 set as the destination address.

Turning to FIG. 6, suppose that computing device 920 includes components that are similar to computing device 602. As such, network interface card 604 of computing device 754 can receive the UDP datagram and extract the remote desktop protocol message stored therein. The message can be routed to remote presentation engine 610, which can process the payload and send it to the appropriate end point. For example, display subsystem 618 in the instance that the payload is indicative of an image or video.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A system, comprising:
   a processor; and
   a memory coupled to the processor, the memory including instructions that upon execution cause the system at least to:
   receive, by a first gateway, a connection request from a client device, wherein the connection request includes a resource network address for a remote presentation session and a connection identifier identifying a connection oriented channel established on a second gateway between the remote presentation session and the client device;
associate a network address for the first gateway with the connection identifier so as to establish a first connectionless channel; and
route a first datagram for the remote presentation session to the client device over the first connectionless channel.

2. The system of claim 1, the memory further comprising instructions that upon execution cause the system at least to:
associate a network address for a third gateway with the connection identifier; and
establish a second connectionless channel.

3. The system of claim 2, the memory further comprising instructions that upon execution cause the system at least to:
route a second datagram for the remote presentation session to the client device over the second connectionless channel, the second datagram including second data indicative of a graphical user interface.

4. The system of claim 1, wherein the first datagram comprises first data indicative of audio.

5. The system of claim 1, the memory further comprising instructions that upon execution cause the system at least to:
extract the connection request from an encrypted package addressed from the client device, the encrypted package including the connection identifier and the resource network address for a remote presentation session in a payload.

6. The system of claim 1, the memory further comprising instructions that upon execution cause the system at least to:
instantiate a connection object, the connection object associated with the resource network address for the remote presentation session and the connection identifier.

7. The system of claim 6, the memory further comprising instructions that upon execution cause the system at least to:
associate a socket handle for the connection object with a network address for the client device.

8. The system of claim 1, the memory further comprising instructions that upon execution cause the system at least to:
deallocate resources on the first gateway used to route the first datagram for the remote presentation session to the client device in response to receipt of a disconnect message indicating that the connection oriented channel associated with the connection identifier was disconnected.

9. The system of claim 1, the memory further comprising instructions that upon execution cause the system at least to:
deallocate resources on the first gateway used to route the first datagram for the remote presentation session to the client device in response to a determination that a timer expired.

10. A method, comprising:
receiving, by a first gateway, a connection request from a client device, the connection request including a resource network address for a remote presentation session and a connection identifier associated with a connection oriented channel established on a second gateway between the remote presentation session and the client device;
associating a network address for the first gateway with the connection identifier;
establishing a first connectionless channel; and
routing a first datagram for the remote presentation session to the client device over the first connectionless channel.

11. The method of claim 10, wherein the first datagram comprises first data indicative of a graphical user interface.

12. The method of claim 10, further comprising:
associating a network address for a third gateway with the connection identifier; and
establishing a second connectionless channel.

13. The method of claim 12, further comprising:
routing a second datagram for the remote presentation session to the client device over the second connectionless channel, the second datagram including second data indicative of audio.

14. The method of claim 10, further comprising:
instantiating a connection object, the connection object associated with the resource network address for the remote presentation session and the connection identifier.

15. The method of claim 14, further comprising:
associating a socket handle for the connection object with a network address for the client device.

16. The method of claim 10, further comprising:
deallocating resources on the first gateway used to route the first datagram for the remote presentation session to the client device in response to receipt of a disconnect message indicating that the connection oriented channel associated with the connection identifier was disconnected.

17. The method of claim 10, further comprising:
deallocating resources on the first gateway used to route the first datagram for the remote presentation session to the client device in response to a determination that a timer expired.

18. A computer readable storage device, comprising computer readable instructions that upon execution on a computing device cause the computing device at least to:
receive, by a first gateway, a connection request from a client device, wherein the connection request includes a resource network address for a remote presentation session and a connection identifier associated with a connection oriented channel established on a second gateway between the remote presentation session and the client device;
associate a network address for the first gateway with the connection identifier;
establish a first connectionless channel; and
route a first datagram for the remote presentation session to the client device over the first connectionless channel.

19. The computer readable storage device of claim 18, further comprising computer readable instructions that upon execution on the computing device cause the computing device at least to:
associate a network address for a third gateway with the connection identifier; and
establish a second connectionless channel.

20. The computer readable storage device of claim 19, further comprising computer readable instructions that upon execution on the computing device cause the computing device at least to:
route a second datagram for the remote presentation session to the client device over the second connectionless channel.

* * * * *